Jan. 10, 1933.  L. A. WILSON  1,893,918
INCUBATOR
Filed June 5, 1930   2 Sheets-Sheet 1

INVENTOR
Leland A. Wilson
BY Arthur C. Brown
ATTORNEY

Jan. 10, 1933. L. A. WILSON 1,893,918
INCUBATOR
Filed June 5, 1930   2 Sheets-Sheet 2

INVENTOR
Leland A. Wilson
BY
ATTORNEY

Patented Jan. 10, 1933

1,893,918

UNITED STATES PATENT OFFICE

LELAND A. WILSON, OF MERRIAM, KANSAS

INCUBATOR

Application filed June 5, 1930. Serial No. 459,325.

My invention relates to incubators and like devices through which air is circulated, and which are provided with means for heating and modifying the humidity of the air.

Incubators ordinarily provide for movement of heated air directly over the eggs therein, and for supplying moisture to the column of air, whereby a current of moist heated air moves with relative rapidity over the surfaces of the eggs, thus subjecting the eggs immediately to any changes in the character of the air current, and incurring the hazards of raising the temperature of the eggs to an undesirable extent, failure to supply sufficient moisture to all of the eggs, and drying out the eggs because of the passage of air currents thereover. The current of air moving in one direction only among the eggs, will tend to heat eggs unequally, to overheat eggs adjacent the heater and underheat eggs remote therefrom, and to apply heat and moisture only to the egg surfaces that are in the path of the current, whereby unequal treatment of the egg surfaces and of the eggs results. The humidity of air contacting eggs being hatched should be accurately controlled, for limiting humidity during the early part of the period and increasing humidity during a few days at the close of the period.

A further disadvantage of present practice is that hatched chicks remain on the trays where they were hatched until removed by an attendant, thus involving disturbance of the trays by an attendant to remove chicks, and retaining the chicks under conditions adapted for eggs but not so suitable for the chicks. Incubators may be tilted or rocked for changing the positions of the eggs, and heating, ventilating and humidifying means may be rendered less efficient because of such adjustment.

The principal objects of my invention therefore are to stabilize the conditions in the space of an incubator occupied by eggs to be hatched, to limit the direct contact of freshly inlet and heated air with the eggs, to assure equal distribution of heat and moisture to all eggs contained in an incubator, to limit the velocity of air currents moving among the eggs, to provide means whereby the hatched chicks may leave egg-supporting trays, to provide a space in the incubator adapted to receive and retain the chicks under suitable conditions, to obviate any hazard of reducing the efficiency of heating, ventilating or humidifying means when an incubator is tilted, to facilitate accurate adjustment of humidity in an incubator, and to effect automatic adjustment of humidity upon tilting of an incubator to turn the eggs.

In accomplishing these and other objects of the invention, I have provided improved details of structure, the preferred forms of which are illustrated in the accompanying drawings, wherein.

Figure 1:
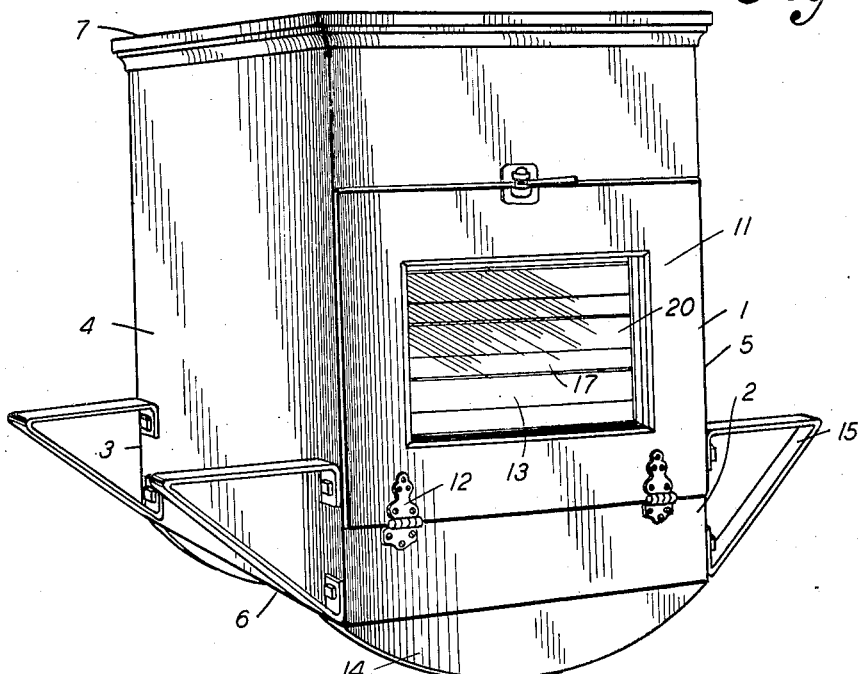
Fig. 1 is a perspective view of an incubator constructed in accordance with my invention.
Figure 2:
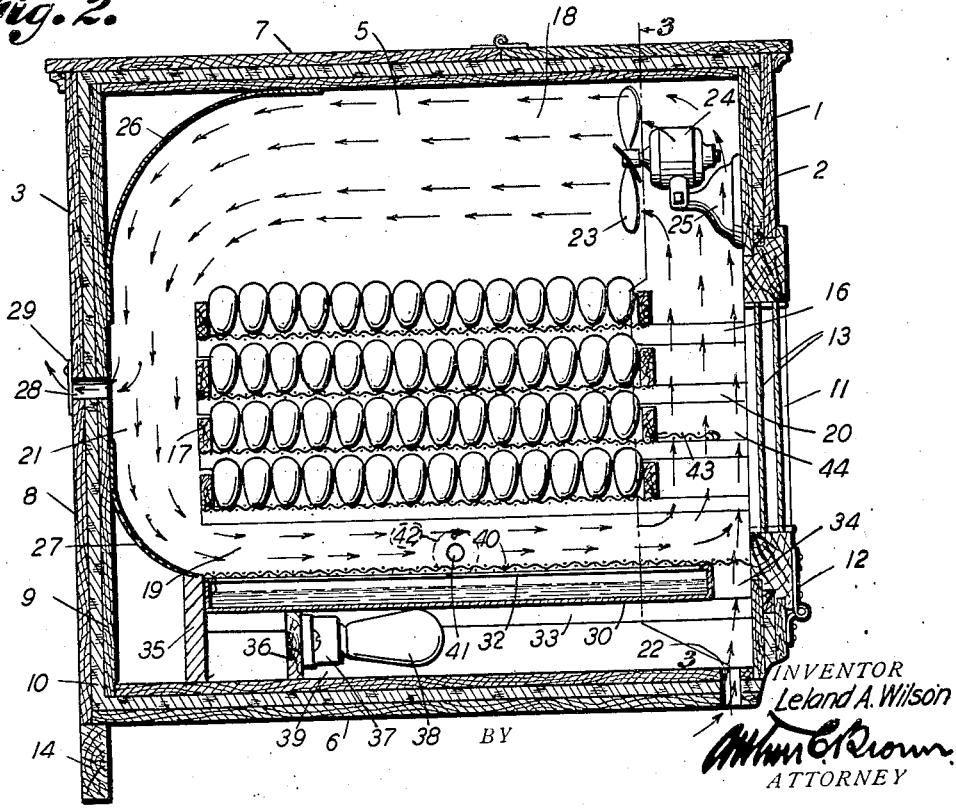
Fig. 2 is a central vertical section of the incubator from front to back in erect position.

Referring in detail to the drawings:

1. designates a casing or housing including vertical front and back walls 2 and 3, side walls 4 and 5, a bottom wall 6, and a top wall 7 forming a chamber, each preferably comprising outer and inner wooden shells 8 and 9 spaced to accommodate insulating material 10. The front wall is apertured to receive a door 11 supported by hinges 12, to afford access to the chamber, and provided with transparent panes 13 to permit inspection of the chamber.

The housing is supported by transverse rockers 14 preferably formed of wood, and wings 15 extend laterally from the housing to support the housing in extreme tilted positions.

Slats or ribs 16 are fixed to the side walls in an intermediate position thereon to slidably support vertically spaced series of trays 17 whereby the trays form a support for eggs spaced from the top and bottom walls to form an upper chamber portion 18 and a lower chamber portion including an air passage 19, and the slats and trays have length limited to locate the ends of the egg support in spaced relation with the front and back walls of the housing to form vertical air channels 20 and 21. The eggs are preferably assembled closely in the trays, with their small ends pointing downwardly, and are supported by each other against tipping.

Air inlet openings 22 are formed in the bottom closely adjacent the front wall, for admitting atmospheric air to the front channel 20, and horizontally directed fans 23 preferably of the propeller type in order that the air discharged thereby will be moved helically to produce uniform mixture of the fresh air with the air in the incubator. The fans are operated by motors 24 which are mounted on brackets 25 on the front wall at the top of the housing so that the air is drawn upwardly in the housing from the inlet and moved rearwardly through the upper chamber portion 18, the current of air being thus passed through the channel 20 and chamber portion 18 without driving air directly over the surfaces of the eggs.

An arcuate diverting shield or deflector 26 having end portions attached respectively to the top and back wall forms a curved guide to direct the horizontally moving induced current of air downwardly into the vertical channel 21, and a similar deflector 27 has one end edge attached to the back wall and a curved portion extending forwardly in the housing in spaced relation with the bottom and the egg support to direct the downwardly moving current of air into a horizontal path below the eggs. The ends of the deflectors attached to the back wall are spaced from the center thereof, and air outlet openings 28 are formed in the back wall substantially midway between the top and bottom of the housing, whereby the current of air tends to move past the openings, but portions of the current may pass therethrough.

Doors or flaps 29 are adjustably supported on the rear wall over the outlet openings 28 by suitable means such as adjusting screws to control movement of air from the housing.

A water containing tray or pan 30 including end flanges 31, and provided with cover plates 32 spaced to afford a central opening the length of the pan, is mounted on slats 33 fixed to the side walls below the slats 16, the pan opening thus extending substantially adjacent the front wall to the deflector in a central position below the eggs. The length of the pan from front to back is limited to locate the front and rear edges in spaced relation with the front and back walls of the housing, the front edge being preferably extended beyond the front edge of the egg support to form a passage or port 34 for air moving from the air inlet to the vertical channel 20.

The rear edge of the pan abuts against a strip 35 extending across the housing to support and secure the lower edge of the deflector 27 and the pan is supported at a suitable elevation to cause the upper edge thereof to lie substantially at the upper edge of the strip, whereby the strip 35 limits the movement of the pan rearwardly into the housing to assure predetermined size of the passage 34, and the top surface of the pan will define the bottom of the horizontal path into which air currents are diverted by the deflector.

Mounted on a bracket 36 comprising a bar of wood secured to the bottom and side walls of the housing, are a series of lamp sockets 37 suitably connected to a source of current, and adapted to receive bulbs 38 for supplying heat to the housing and vaporizing water in the pan.

The bar 36 is adapted to engage the pan, and assist in supporting the same, and is located adjacent the rear edge of the pan to form a limited heating chamber 39 in which the sockets are located, and which communicates with the housing through the passage 34.

A screen 40 may be loosely mounted on the pan to cover the opening therein; and preferably has sufficient length to overlie the passage 34.

In order to replenish the supply of water in the incubator during the incubating period, an opening 41 is formed in one of the side walls of the housing into which a suitable utensil such as a funnel may be inserted for delivering water to the pan, and normally covered by a hinged flap 42 for preventing loss of moisture and heated air therethrough.

A screen 43 is supported by selected slats 16 in front of an intermediate tray 17 of the series to extend horizontally into the channel 20 and has limited width from front to back whereby a space or passage 44 is left between the edge of the screen and the front wall, to form a shelf or platform to receive chicks falling from trays above the shelf, and from which the chicks may flutter or fall through the passage 44 to the lower screen.

Figures 3, 4:
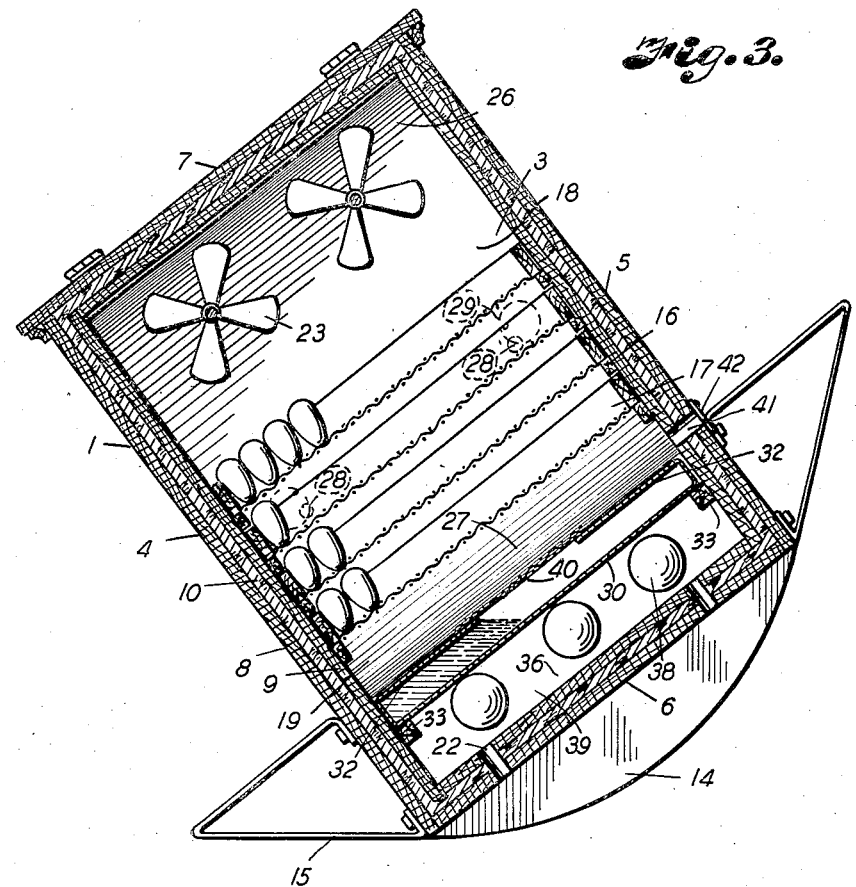
Fig. 3 is a section on the line 3—3, Fig. 2, illustrating the incubator in tilted position.
Fig. 4 is a perspective view of a water-containing tray.

In using the device, egg-filled trays will be installed on the slats, and a pan preferably partly filled with water will be installed below the eggs to supply moisture to the air in the housing, only sufficient water being supplied to fill one of the chambers formed by the bottom, side walls, and one cover member when the housing is in a tilted position as shown in Fig. 3. Current will then be supplied to the fans and bulbs to energize the same.

The fan will draw air through the inlet opening and passage 34, and move the air through the channel 20, upper chamber, channel 21, and passage 19, back to the inlet channel 20, whereby air will be continuously circumvolved in one direction around the eggs, the housing being relieved of air through the back wall air outlets, which may be controlled by the flaps to assure desired circulating conditions.

The circulating column of air will tend to entrain air in the space occupied by the eggs, and draw air therefrom, and thus set up slight secondary movement of air among the eggs.

The heater will heat air in the heating chamber, and will also directly heat the pan, for raising the temperature of the water therein for dissipating vapor, which will be largely entrained by the current of air moving through the passage 19, some of the moisture rising to the space occupied by the eggs to impart heat and moisture thereto.

The housing may be tilted periodically during part of the incubating period to reposition the eggs, the cover leaves on the pan preventing water from spilling therefrom.

In hatching chicks, it is desirable to regulate the amount of humidity in the space occupied by the eggs for the first 18 days of the incubating period, to prevent excessive evaporation in the eggs and yet it is desirable to allow some evaporation. If the egg evaporates too much the chick will be weak or die in the shell and if the evaporation is too little the yolk may not be absorbed in proper manner by the chick and in trying to peck through into the air cell he may be drowned by excessive liquid matter in the egg. The humidity may be increased the last three days to soften the shells at the close of the incubation period so that the chicks may more easily break through.

Maintenance of the housing in tilted positions during part of the incubation period will effect limitation of humidity in the egg containing space, since a relatively small inclined surface of water is formed at the edge of the opening in the pan, when the housing and pan are tilted, said surface having only slightly greater area than the vertical cross section of the pan, and substantially less area than the opening, due to the fact, as clearly shown in the figures, that the depth of the pan is considerably less than the width of the opening from front to back.

When the housing is tilted, the water will flow from one pan portion to the other, and in either position a small evaporation surface of water will be formed. The housing is tilted from side to side periodically to extreme tilted positions during the first 18 days of the incubation period, and maintained in one or the other of the tilted positions to limit humidity.

The tilting adjustment of the housing is suspended after the 18th day, and the housing is positioned upright or vertically, whereby the water spreads over the bottom of the pan, forming a maximum and relatively large evaporation surface for inceasing the volume of vapor, and causing the water to extend entirely across the pan opening through which vapor may pass in larger volume toward the eggs, to moisten and soften the shells.

Water dissipated in vapor may be replaced by delivering a suitable quantity of water through the supply opening to the adjacent cover member, when the housing is suitably tilted, to flow over the cover member and through the pan opening into the pan.

The amount of vapor carried within the incubator may be controlled by regulating amount of air passing from the openings 28 by adjusting the flaps or doors 29 over the openings, that is the more that the openings are shut off, less air will be moved from the incubator and the moisture is retained, but when the ports are wide open the air passing therethrough will carry the moisture with it resulting in a lower moisture content.

Chicks hatched from the eggs may jump or fall from the trays to the pan and lower screen, their fall through the channel 21 being partly broken by the curved deflector 27, and their fall from upper trays into the front channel being broken by the intermediate screen from which they may jump or fall to the pan, the lower screen preventing the chicks from passing to the heating chamber.

The chicks may thus quickly pass after hatching from the trays to the pan, and will be retained in the air passage, where they will have the benefit of the heat from the pan, and the more quickly changing air in the passage.

The pan and curved lower deflector having substantially greater area than a tray, will accommodate many chicks, and the incubator need not be opened frequently to move freshly hatched chicks.

Attention is called to the formation of a moving body of heated air around the eggs, due to the spacing of the egg support from the casing walls, the movement of air by the fans, and the service of the deflectors, whereby substantially equal heat effect is exerted upon all the eggs on the support, and overheating or underheating of any eggs are avoided. The relatively small air outlets permit air to be circulated but allow for escape of foul air.

The pan divides the casing into an incubating chamber and a heating chamber. The substantially sealed engagement of all but one edge of the pan with the casing members restricts hot dry air from the heating chamber to movement through the port afforded by the spaced edge into the column of fresh air entering the vertical front channel 20 of the incubating chamber through the ports 22 and 34. The heated air therefore assists in effecting movement of fresh air into the incubating chamber. The heated dry air is not allowed to enter directly into the space occupied by the eggs, however, but mingles with moist air being circulated by the fan, and is thus humidified.

Close control of the humidity of air in the incubating chamber is therefore afforded, and the dry air enters the channel 20 at the point of delivery thereto of circulating air from the passage over the water pan.

What I claim and desire to secure by Letters Patent is:

1. In an incubator, a casing including a bottom wall having an air inlet adjacent one edge thereof, side walls, a front wall, and a back wall having an air outlet port, means for inducing flow of current of air through the inlet into the casing, an egg tray, means on the side walls for supporting the tray in spaced relation with said front and back walls, a water containing pan, and means for supporting said pan in the casing below the egg tray and in spaced relation therewith to form an air passage and with one edge spaced laterally from the air inlet for passage of air from said inlet into the casing.

2. In an incubator, a casing including side walls, a front wall, a back wall, a top wall and bottom wall provided with an inlet port adjacent one of said vertical walls, another of said vertical walls having an air outlet port, an egg tray, means on the side walls for supporting the egg tray in spaced relation from the others of said walls, a fan in the casing, means for supporting the fans on the front wall for effecting circulation of air in the casing, heating means including a water-containing pan, and means for supporting the water containing pan below the egg tray and spaced therefrom to form a horizontal passage for currents of air between the pan and the egg tray.

3. In an incubator, a normally vertically positioned casing, means for supporting the casing for tilting back and forth in one direction, an egg tray, means for supporting said tray in the casing, a pan in and tiltable with the casing, and a cover on the pan comprising imperforate leaves spaced to form an opening extending transversely to the direction of tilting movement of the pan to vary the exposed surface of liquid in the pan when the incubator is moved from vertical to tilted position.

4. In an incubator including a normally horizontally positioned egg tray, means supporting the tray for sidewise tilting movement, means limiting the tilting movement of the tray, a pan, means for supporting the pan in tilting relation with the tilting movement of the tray to elevate and lower the side edges of the pan, said pan having substantially less height than width, and a cover on the pan having a central opening and having imperforate portions at said side edges of the pan to vary the exposed area of the liquid in the pan when the tray is moved from horizontal to tilted position.

5. In an incubator including a housing, a group of superimposed egg trays, means for supporting said trays within the housing in spaced relation with the top, bottom and opposite side walls thereof to form a definite air passageway extending completely around said group of trays in one direction, a fan, and means for supporting the fan at a fixed point in said air passageway to cause the fan to circumvolve a defined air stream through said air passageway continuously in one direction and out of direct contact with eggs in said trays to maintain uniform temperature about said trays.

6. In an incubator including a housing, a group of superimposed egg trays, means for supporting said trays within the housing in spaced relation with the top, bottom and opposite side walls thereof to form a definite air passageway extending completely around said group of trays in one direction, a fan, means for supporting the fan at a fixed point in said air passageway to cause the fan to circumvolve a defined air stream through said air passageway continuously in one direction and out of direct contact with eggs in said trays to maintain uniform temperature about said trays, a water pan, and means for supporting the water pan within the housing so that water carried in the pan is in contact with said air stream to supply moisture thereto.

7. In an incubator including a housing, a group of superimposed egg trays, means for supporting said trays within the housing in spaced relation with the top, bottom and opposite side walls thereof to form a definite air passageway extending completely around said group of trays in one direction, a fan, means for supporting the fan at a fixed point in said air passageway to cause the fan to circumvolve a defined air stream through said air pasageway continuously in one direction and out of direct contact with eggs in said trays to maintain uniform temperature about said trays, a water pan, means for supporting the water pan within the housing so that water carried in the pan is in contact with said air stream to supply moisture thereto, a heater, and means for supporting the heater below said pan for heating said air stream.

8. In an incubator including a housing, a group of superimposed egg trays, means for supporting said trays within the housing in spaced relation with the top, bottom and opposite side walls thereof to form a definite air passageway extending completely around said group of trays in one direction, a fan having propeller type blades to circumvolve and helically move a defined air stream through said air passageway continuously in one direction and out of direct contact with eggs in said trays to maintain a uniform temperature about said trays, and means for supporting the fan at a fixed point in said air passageway.

9. In an incubator including a housing, egg supporting means in the housing, means carried in the housing for retaining said egg supporting means in spaced relation with the top, bottom and opposite side walls thereof to form definite air passageways extending above and below said egg supporting means and vertical passageways in communication with the ends of said horizontal passageways to provide a substantially rectangular airway about said egg supporting means in one direction, a fan, means for supporting said fan at a fixed point in the end of one of said passageways to cause the fan to circumvolve an air stream through said rectangular airway continuously in one direction and out of contact with eggs in said egg supporting means to maintain uniform temperature about said eggs.

10. In an incubator including a housing, a group of superimposed egg trays, means for supporting said group of trays within the housing in spaced relation with the top, bottom and opposite side walls thereof to form horizontal air passageways above and below said group of trays and vertical passageways at opposite ends of said trays in communication with the horizontal passageways, a fan, means for supporting said fan at a fixed point in one end of said upper horizontal passageway to cause said fan to direct an air stream therethrough, a curved deflector at the opposite end of the upper horizontal passageway to divert the air stream downwardly through the vertical passageway remote from the fan, and a second curved deflector at the lower end of said vertical passageway for diverting the air stream through said lower horizontal passageway to the other of said vertical passageways for return to the fan.

11. In an incubator including a housing, a group of superimposed egg trays, means for supporting said group of trays within the housing in spaced relation with the top, bottom and opposite side walls thereof to form horizontal air passageways above and below said group of trays and vertical passageways at opposite ends of said trays in communication with the horizontal passageways, a fan, means for supporting said fan at a fixed point in one end of said upper horizontal passageway to cause said fan to direct an air stream therethrough, a curved deflector at the opposite end of the upper horizontal passageway to divert the air stream downwardly through the vertical passageway remote from the fan, a second curved deflector at the lower end of said vertical passageway for diverting the air stream through said lower horizontal passageway to the other of said vertical passageways for return to the fan, a water pan having one end engaging the second named deflector and its opposite end spaced from the housing to provide an opening for admitting fresh air to the air stream, means for supporting the pan, a heater for heating said air stream, and means for supporting the heater below the water pan.

12. In an incubator, a rectangular-shaped housing, means including a water pan extending completely across the housing between two opposite side walls and from an adjacent side wall to a point spaced from the opposite side wall for dividing the housing into an incubating chamber and a heating chamber to provide a port between said chambers at one end of the water pan, a heater located in the heating chamber below said pan, a group of egg trays in the incubating chamber, means for supporting said group of trays within the the incubating chamber in spaced relation with the water pan and the top and side walls of the housing to form a definite air passageway extending completely around said group of trays in one direction and over said port, a fan in the incubating chamber, and means for supporting the fan at a fixed point in said passageway to cause the fan to circumvolve a defined air stream around said group of trays in one direction and over said port to effect movement of heated air through the port into the incubating chamber.

13. In an incubator including a normally vertically positioned casing, means for tiltingly supporting the casing, an egg tray, means for supporting the egg tray within the casing, means in the casing for controlling humidity of the air therein including a liquid containing pan, means for supporting the pan within the casing, and a cover for the pan having less width than the pan to form an opening for escape of vapor from the surface of liquid exposed to atmosphere and to vary the extent of surface of the liquid exposed to atmosphere to reduce the rate of evaporation of the liquid when the casing is in tilted position.

14. In an incubator including an egg tray, means for supporting the egg tray, means for tiltingly mounting the tray supporting means to effect movement of the tray into sidewise tilted position when the tray supporting means is tilted, humidifying means including a liquid containing pan having rectangular shape, means for carrying the pan within the tray supporting means so that the position thereof is changed in correspondence with the egg tray when the tray supporting means is tilted, and spaced cover plates extending from opposite sides of the pan to effect automatic limitation of the extent of surface of the liquid that is exposed to atmosphere when the tray supporting means is tilted.

15. In an incubator including a casing, an egg tray, means for supporting the egg tray in the casing, means for supporting the casing for tilting in a lateral direction, a liquid retaining pan having width approximately equal to the width of the casing, means for supporting said pan in the casing so that the pan tilts with the casing, a heater including a plurality of laterally spaced heat emitting elements, means for supporting said heating elements within the casing in heating relation with opposite side portions of the pan so that the spreading extent of the liquid over the heating surface is greater when the casing is in horizontal position.

In testimony whereof I affix my signature.

LELAND A. WILSON.